United States Patent
Yamamoto et al.

(10) Patent No.: US 7,964,062 B2
(45) Date of Patent: Jun. 21, 2011

(54) PAPER TREATING AGENT COMPRISING A SILICONE COMPOSITION

(75) Inventors: Kenji Yamamoto, Annaka (JP); Masahiko Ogawa, Takasaki (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 576 days.

(21) Appl. No.: 11/254,812

(22) Filed: Oct. 21, 2005

(65) Prior Publication Data

US 2006/0089427 A1   Apr. 27, 2006

(30) Foreign Application Priority Data

Oct. 22, 2004 (JP) ................. 2004-308910
Oct. 17, 2005 (JP) ................. 2005-302139

(51) Int. Cl.
| D21H 19/00 | (2006.01) |
| C08L 83/04 | (2006.01) |
| C08L 83/05 | (2006.01) |
| C08L 83/06 | (2006.01) |
| C08L 83/07 | (2006.01) |

(52) U.S. Cl. .......... 162/164.4; 162/158; 106/162.5; 106/287.16; 524/588

(58) Field of Classification Search .......... 106/162.5, 106/287.16, 158, 164.4; 524/588
See application file for complete search history.

(56) References Cited

U.S. PATENT DOCUMENTS

| 2,869,722 A * | 1/1959 | Marander et al. ............ 206/447 |
| 4,300,635 A * | 11/1981 | Glinsmann ................ 166/270.1 |
| 4,347,346 A * | 8/1982 | Eckberg ......................... 528/15 |
| 4,609,574 A * | 9/1986 | Keryk et al. ................ 427/407.1 |
| 4,935,458 A * | 6/1990 | Suzuki et al. .................... 524/41 |
| 5,134,203 A * | 7/1992 | Hockemeyer et al. ........ 525/478 |
| 5,229,212 A * | 7/1993 | Reed ............................... 428/429 |
| 5,241,034 A * | 8/1993 | Herzig et al. ................... 528/15 |
| 5,500,148 A * | 3/1996 | Ohba et al. ....................... 516/76 |
| 6,184,188 B1 * | 2/2001 | Severns et al. ................ 510/101 |
| 6,794,444 B2 * | 9/2004 | Yamamoto et al. ............ 524/588 |
| 7,459,213 B2 * | 12/2008 | Yamamoto et al. ............ 428/447 |
| 2003/0143408 A1 * | 7/2003 | Benayoun et al. ............. 428/447 |
| 2004/0152825 A1 * | 8/2004 | Yamamoto et al. ............ 524/503 |
| 2007/0032596 A1 * | 2/2007 | Yamamoto et al. ............. 525/58 |
| 2008/0064814 A1 * | 3/2008 | Yamamoto et al. ............. 525/58 |
| 2009/0011254 A1 * | 1/2009 | Yamamoto et al. ............ 428/447 |

FOREIGN PATENT DOCUMENTS

| DE | 2449085 | * | 4/1976 |
| EP | 1 088 939 A1 | | 4/2001 |
| JP | 56-138197 A | | 10/1981 |
| JP | 59-147048 A | | 8/1984 |
| JP | 61-228064 A | | 10/1986 |
| JP | 64-6196 A | | 1/1989 |
| JP | 03-091565 A | | 4/1991 |
| JP | 6-57144 A | | 3/1994 |
| JP | 10-7738 A | | 1/1998 |
| JP | 11-222557 A | | 8/1999 |
| JP | 2000-87013 A | | 3/2000 |
| JP | 2000-144120 A | | 5/2000 |
| JP | 2000-169735 A | | 6/2000 |
| JP | 2000-219823 A | | 8/2000 |
| JP | 2001-98033 A | | 4/2001 |
| JP | 2001-98156 A | | 4/2001 |
| JP | 2002-121082 A | | 4/2002 |
| JP | 2002-220539 A | | 8/2002 |
| JP | 2003-213005 A | | 7/2003 |

OTHER PUBLICATIONS

Certified English translation of DE-2449085.*

* cited by examiner

Primary Examiner — Matthew J Daniels
Assistant Examiner — Dennis Cordray
(74) Attorney, Agent, or Firm — Birch, Stewart, Kolasch & Birch, LLP

(57) ABSTRACT

A paper treating agent comprising 100 parts by mass of organopolysiloxane (A), from 100 to 100,000 parts by mass of water (E), and 0.1 to 100 parts by mass of a surfactant (F), characterized in that the agent further comprises 50 to 1,000 parts by mass of a cellulosic resin (C), wherein 0.5 to 2.5 hydroxyl groups per glucose unit of said cellulosic resin are etherized or esterified, and a viscosity of an aqueous 2% solution of said cellulosic resin is from 2 to 100 mPa·s.

5 Claims, No Drawings

US 7,964,062 B2

PAPER TREATING AGENT COMPRISING A SILICONE COMPOSITION

CROSS REFERENCES

This application claims benefits of Japanese Patent Application No. 2004-308910 and Japanese Patent Application No. 2005-302139, contents of which are incorporated by reference.

FIELD OF THE INVENTION

The present invention relates to a paper treating agent capable of providing various kinds of paper substrates with water repellency and oil repellency, in particular, to a paper treating agent comprising organopolysiloxane and a cellulosic resin, which agent is safe and suitably used in the application for food.

BACKGROUND OF THE INVENTION

Paper used in the application for food, such as wrapping paper, containers, and cooking paper, is provided with water repellency, oil repellency to prevent oily or aqueous ingredients of the food from penetrating into the paper and staining its surroundings. Paper is also provided with non-tackiness to prevent the food from sticking to the paper and from being deformed or broken when the food is taken out.

To provide water and oil repellency and non-tackiness, treating agents have been used, which comprise various kinds of compounds having a perfluoroalkyl group such as polymers having a perfluoroalkyl group. Most of these treating agents have been widely used in a form of an aqueous dispersion in an internal addition method or an external addition method in paper making processes.

PRIOR ART

Concerning these methods, Japanese Patent Application Laid-Open No. 10-7738 describes improvement on solubility, Japanese Patent Application Laid-Open No. 2000-169735 describes a treatment method to prevent decrease in oil repellency, Japanese Patent Application Laid-Open No. 2001-98033 describes improvement of secondary processability, and Japanese Patent Application Laid-Open No. 2002-220539 describes improvement on adhesion to paper.

Also is known a treating agent comprising an amine salt of phosphate ester having a perfluoroalkyl group. For instance, Japanese Patent Application Laid-Open Nos. 64-6196 and 56-138197 disclose improvement in stability of dispersion, and Japanese Patent Application Laid-Open Nos. 2000-87013 and 2000-144120 describe improvement in stability during storage.

Use of aliphatic fluorohydrocarbons is restricted because they are ozone-depleting or globe-warming substances. The compounds having a perfluoroalkyl group with similar structure as that of the aliphatic fluorohydrocarbons also may be prohibited in a near future due to environmental concerns. In the field of food wrapping materials, likelihood has been pointed out that a trace amount of hazardous substances containing fluorine may occur in cooking. Further likelihood has been pointed out that hazardous substances containing fluorine such as hydrogen fluoride are discharged into the environment in incineration of waste paper.

In the aforesaid situation, there is a need for a treating agent which eliminates use of compounds having a perfluoroalkyl group and provides paper with water and oil repellency and non-tackiness. For instance, a composition in a form of emulsion comprising a silicone release agent and a PVA resin is known from Unites States Patent Application Laid-Open No. 2004-0152825.

SUMMARY OF THE INVENTION

However, in the field of food wrapping, the safety requirements are so high that further improvement should be made on the aforesaid PVA resin composition.

Thus, the present invention is a paper treating agent comprising 100 parts by mass of an organopolysiloxane (A), 100 to 100,000 parts by mass of water (E), and 0.1 to 100 parts by mass of a surfactant (F) and is characterized in that the composition further comprises 50 to 1,000 parts by mass of a cellulosic resin, wherein 0.5 to 2.5 hydroxyl groups per glucose unit of said cellulosic resin are etherized or esterified and a viscosity of an aqueous 2% solution of said cellulosic resin is from 2 to 100 mPa·s.

THE EFFECTS OF THE INVENTION

The composition of the present invention is capable of providing paper with better properties without causing damages on the environment, and is more excellent in safety, and more suitable in the application for food, compared to the treating agent comprising polyvinyl alcohol.

PREFERRED EMBODIMENTS OF THE INVENTION

As the paper substrate used in the present invention, commercially available paper can be used, such as craft paper, high quality paper, liners, and corrugated cardboards. Use may be also made of paper made from natural fibers such as Manila hemp, paper mulbery, and Edgeworthia papyrifera, and paper made substantially of synthetic fibers such as Tetron, Vinylon, and acrylic fibers.

The paper treating agent of the present invention is characterized in that the agent comprises the specific cellulosic resin (C). The celullosic resin is such that its hydroxyl group is etherified and/or esterified. The agent may comprise both of the etherifed cellulosic resin and the esterified cellulosic resin. Preferably use is made of an etherfied cellulosic resin, i.e. cellulose ether, more preferably methyl cellulose.

Cellulose esters may be obtained by reacting cellulose with an esterifying agent such as an anhydride of organic acid, purifying, and drying. Examples of the esterifying agent include acetic acid, acetic anhydride, propionic anhydride, butyric anhydride, and acetyl chloride. Cellulose ethers are prepared by converting cellulose with caustic soda into alkalized cellulose, reacting the alkalized cellulose with an etherifying agent, purifying, and drying. As the etherifying agent, use may be made of methyl chloride, ethyl chloride, propylene oxide, ethylene oxide, and monochloroacetic acid. Many of the cellulose esters and the cellulose ethers are known to be innocuous to a human body, biodegradable in a gradual rate, and environmentally friendly and, therefore, they are permitted as food additives, pharmaceuticals, and materials for cosmetics.

Properties of cellulose ether are specified mainly by a degree of polymerization and a degree of substitution. A preferred degree of polymerization of the cellulose ether used in the present invention is such that a viscosity of an aqueous 2% solution of the cellulose ether at 20 degrees C is in the range of from 2 to 100 mPa·s, preferably from 3 to 50 mPa·s, most preferably from 5 to 50 mPa·s. If the viscosity is lower than the aforesaid lower limit, a sufficient thickening effect may not be obtained. If the viscosity is higher than the aforesaid upper limit, a coating property of a cellulose composition may be worse.

A degree of substitution of cellulose ether is the number of etherified or esterified hydroxyl groups per glucose ring of the cellulose. A particularly preferred degree of substitution of the cellulose ether is from 0.5 to 2.5, preferably from 0.6 to 2.3, more preferably from 0.7 to 2.3. If the degree of substitution is lower than the aforesaid lower limit, solubility in water is too low to efficiently prepare a composition. If the degree of substitution exceeds the upper limit, the resulting composition may fail to provide paper with sufficient oil repellency.

Cellulose ether may be used alone or as a blend of two or more of the cellulose ethers and the cellulose esters.

In addition to the above-described ether group and ester group, celluloseic resin (C) may have other substituents. Examples of the substituents include hydrocarbon group of 1 to 20 carbon atoms, such as alkyl groups and aryl groups, which groups may be optionally have silicon-containing substituents. Preferred are alkyl groups having 1 to 20 carbon aboms. Typically at most 5%, preferably at most 4% of the total hydroxyl groups may be substituted as long as the object of the present invention is not impaired. Those substituents improve compatibility of the cellulose with organopolysiloxane.

As the cellulose ether, use may be made of commercially available cellulose ethers, such as Methocel and Ethocel, trademarks from Dow Chemical, Natrosol, a trademark from Hercules, HEC Daicel and CMC Daicel, trademarks from Daicel Chemical Industries LTD., Fuji Chemi HEC, a trademark from Sumitomo Seika Chemicals Co., Ltd., Cellogen from Daiichi Kogyo Seiyaku Co., Ltd., and Metholose from Shin-etsu Chemical, Co., Ltd.

The cellulose ethers may be blended with various kinds of additives as long as the effects of the present invention are not impaired. For instance, adhesion to a paper substrate may be improved by adding a silane coupling agent in an amount of from 0.5 to 10 mass %, relative to the cellulose ether. Illustrative examples of the silane coupling agent include
3-glycidoxypropyltrimethoxysilane,
3-glycidoxypropylmethyldimethoxysilane,
3-methacryloxypropyltrimethoxysilane, and
3-methacryloxypropylmethyldimethoxysilane.

The amount of cellulosic resin (C) to be incorporated ranges from 50 to 1,000 parts by mass, preferably from 60 to 900 parts by mass, per 100 parts by mass of the organopolysiloxane (A). If the amount is below the aforesaid lower limit, oil repellency of a paper treated with the present agent may not be sufficient. If the amount is above the aforesaid upper limit, water repellency may not be sufficient.

Organopolysiloxane (A) used in the treating agent of the present invention may be any one of the following three types.

The first type of the organopolysiloxane (A) is the organopolysiloxane (A1) represented by the following average compositional formula (1).

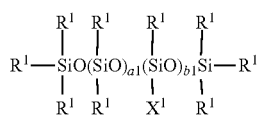
(1)

wherein each $R^1$ may be same or different and is a monovalent hydrocarbon radical having 1 to 20 carbon atoms. Optionally a part or all of the hydrogen atoms bonded to the carbon atoms in $R^1$ may be replaced with a different group. Specifically, $R^1$ may be selected from the group consisting of alkyl groups such as methyl, ethyl, propyl, and butyl groups; alicyclic groups such as a cyclohexyl group; and aryl groups such as phenyl and tolyl groups, groups wherein a part or all of the hydrogen atoms bonded to the carbon atoms are replaced by a halogen atom or a cyano group, such as 3,3,3-trifluoropropyl, 3-cyanopropyl, and 3-aminopropyl groups. Preferably, at least 80% of $R^1$ in the organopolysiloxane (A1) is a methyl group. If a part of the hydrogen atoms bonded to the carbon atoms in $R^1$ is replaced with a halogen atom, $R^1$ has preferably 1 to 5 carbon atoms.

In the formula (1), $X^1$ is represented by the following formula:

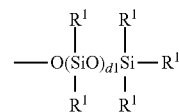

wherein $R^1$ is as defined above and a1, b1 and d1 are such numbers that the organopolysiloxane (A1) has a viscosity at 25 degrees C. of from 0.05 to 500 Pa.s, preferably from 0.1 to 100 Pa.s. The symbols, b1 and d1, may be zero. If the viscosity is below the aforesaid lower limit, it may be difficult to provide paper with sufficient non-stickiness. If the viscosity is above the aforesaid upper limit, compatibility of (A1) with cellulosic resin (C) in the composition decreases. Preferably, a1, b1 and d1 satisfy the inequality, $28<=a1+b1*(d1+1)<=2,000$.

The aforesaid agent comprising organopolysiloxane (A1) does not require a curing process and, therefore, is advantageously used when it is desired to render paper water repellent and oil repellent in a short period of time in a simple process.

The second type of organopolysiloxane (A2), which is used in combination with cross-liking agent (B), has at least two hydroxyl groups per molecule and is represented by the following formula (2):

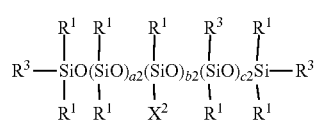
(2)

wherein $R^1$ is as defined above. $R^3$ is a hydroxyl group and $X^2$ is a group represented by the following formula:

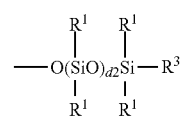

wherein $R^1$ is as defined above, a2, b2, c2 and d2 are such numbers that a viscosity at 25 degrees C. of the organopolysiloxane (A2) ranges from 0.05 to 500 Pa.s, preferably from 0.1 to 100 Pa.s, and b2, c2 and d2 may be zero. Preferably, a2, b2 c2 and d2 satisfy the inequality, $28<=a2+b2*(d2+1)+c2<=2,000$.

The hydroxyl groups in the organopolysiloxane (A2) react with the cross-linking agent (B2) described below to from a cured film. The organopolysiloxane (A2) should have at least two hydroxyl groups per molecule. If the number of the hydroxyl groups is less than two, water repellency of paper treated with such an agent tends to worsen with time, which is undesirable. Preferably, the number of the hydroxyl groups per molecule, b2+c2+2 in formula (2), ranges from 2 to 150, and the amount of the hydroxyl groups per 100 g of the organopolysiloxane (A2) ranges from 0.0001 mole to 0.1 mole. If the amount is less than the aforesaid lower limit, the water repellency may worsen with time. If the amount exceeds the aforesaid upper limit, a pot life of such a composition tends to be shorter.

The cross-linking agent (B) is organopolysiloxane (B2) that has at least three SiH bonds or other hydrolyzable groups. The organopolysiloxane (B2) is used in such an amount that a molar amount of the SiH bond and the hydrolyzable group is 5 to 200 times as much as a molar amount of the hydroxyl groups in the organopolysiloxane (A2). Typically, the organopolysiloxane (B2) is used in an amount of from 0.1 to 30 parts by mass per 100 parts by mass of the organopolysiloxane (A2). If the amount of the SiH bond and the hydrolyzable group is less than the aforesaid lower limit, a sufficient amount of the cross-linkage may not be obtained and, accordingly, sufficient water repellency or non-tackiness may not be provided to paper. Meanwhile, if the SiH group and hydrolyzable group are formulated in an amount more than the aforesaid upper limit, the effect may not be so high as expected. This lowers cost performance and, rather, the composition may tend to change with time.

The organopolysiloxane (B2) having SiH bonds is represented by the compositional formula $R^1_f H_g SiO_{(4-f-g)/2}$, wherein $R^1$ is as defined above for the formula (2), f and g are numbers with $0 \leq f \leq 3$, $0 < g \leq 3$, and $1 \leq f+g \leq 3$. As to the structure of the organopolysiloxane (B2), it must have at least three SiH bonds in a molecule, but there are no other requirements. The organopolysiloxane (B2) may be linear, branched or cyclic and may have a viscosity of from several mPa·sec to several tens Pa.sec.

Examples of the organopolysiloxane (B2) having SiH bonds are as shown below.

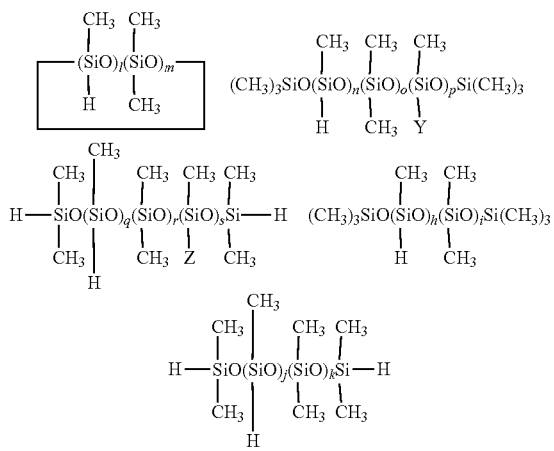

In the above formulae, Y and Z are groups represented by the following formulae, and h to w are numbers as follows: h, l and n are numbers of from 3 to 500; m, p, and s are numbers of from 1 to 500; and i, j, k, o, q, r, t, u, v and w are numbers of from 0 to 500.

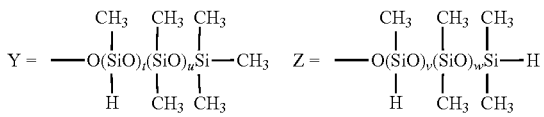

The organopolysiloxane (B2) having hydrolyzable groups is represented by the compositional formula $R^1_f W_g SiO_{(4-f-g)/2}$, wherein $R^1$ is as defined above for the formula (2), W is a hydrolyzable group, f and g are numbers with $0 \leq f \leq 3$, $0 < g \leq 3$, and $1 \leq f+g \leq 3$. As to the structure of the organopolysiloxane (B2), it must have at least three hydrolyzable groups in a molecule, but there is no other requirement. The organopolysiloxane (B2) may be linear, branched or cyclic and have a viscosity of from several mPa·sec to several tens Pa.sec.

Examples of the hydrolyzable groups include alkoxy groups such as methoxy, ethoxy, propoxy, butoxy, methoxyethoxy, and isopropenoxy groups; acyloxy groups such as an acetoxy group; alkylamino groups such as an ethylamino group; amido groups; oxime groups such as an ethylmethylbutanoxime group.

Examples of the organopolysiloxane (B2) are as shown below.

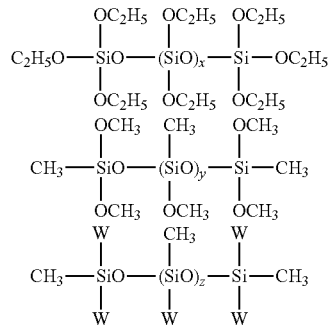

wherein W means a hydrolyzable group such as $CH_3COO—$, $CH_3(C_2H_5)C=NO—$, $(C_2H_5)_2N—$, $CH_3CO(C_2H_5)N—$, and $CH_2=C(CH_3)—O—$, and x, y, and z are integers of from 0 to 500.

The organopolysiloxane (A2) can be reacted with (B2) without any catalyst, but the catalyst (D) may be used when the reaction conditions are strictly limited, for instance when a heating temperature is limited. Examples of the preferred catalyst (D2) include acids such as hydrochloric acid, phosphoric acid, methanesulfonic acid, p-toluenesulfonic acid, maleic acid, and trifluoroacetic acid; alkalis such as sodium hydroxide, potassium hydroxide, sodium ethoxide, and tetraethylammonium hydroxide; salts such as ammonium chloride, ammonium acetate, ammonium fluoride, and sodium carbonate; salts of organic acids and metals such as magnesium, aluminum, zinc, iron, zirconium, cerium, and titanium; and organometallic compounds such as alkoxides and chelate compounds such as zinc dioctate, titanium tetraisopropoxide, aluminum tributoxide, and zirconium tetraacetylacetonate.

The aforesaid catalyst may be used in an effective amount, that is, at least a minimum amount enough to react (A2) with (B2). The effective amount may vary depending on reaction conditions, a desired curing speed and other factors and is typically in the range of from 0.1 to 5 mass %, calculated as an active ingredient, based on a total mass of (A2) and (B2).

The third type of the organopolysiloxane (A3) has at least two alkenyl groups and is represented by the following average compositional formula (3).

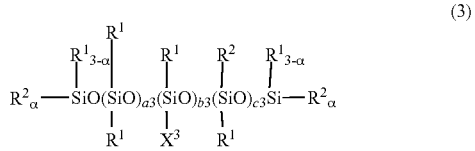
(3)

wherein, $R^1$ is as defined for the formula (1). Preferably, at least 80% of $R^1$ is a methyl group. $R^2$ represents an alkenyl group having 2 to 20 carbon atoms, specifically a vinyl group, an allyl group, or a hexenyl group. A vinyl group is most preferred. $X^3$ is a group represented by the following formula:

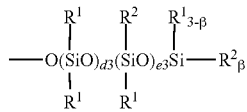

wherein $R^1$ is as defined above for the formula (1), and a3, b3, c3, d3, and e3 are such numbers that the organopolysiloxane (A3) has a viscosity at 25 degrees C. of from 0.05 to 500 Pa.s, preferably from 0.1 to 100 Pa.s, and b3, c3, d3, and e3 may be zero. In the formula, alpha and beta are integers of from 0 to 3. Preferably, a3, b3, c3, d3 and e3 satisfy the inequality, $28<=a3+b3*(d3+e3+1)+c3<2,000$.

The alkenyl groups in the organopolysiloxane (A3) react with the cross-linking agent (B3) to form a cured film. The organopolysiloxane (A3) should have at least two alkenyl groups per molecule. If the number of the alkenyl groups is less than two, water repellency of paper treated with such a composition tends to worsen with time, which is undesirable.

Preferably, the number of the alkenyl groups in the formula (3), $b3*(e3+beta)+c3+2*alpha$, ranges from 2 to 150, and an amount of the alkenyl groups per 100 g of the organopolysiloxane (A3) ranges from 0.001 mole to 0.1 mole. If the amount is less than the aforesaid lower limit, the water repellency of paper may worsen with time. If the amount exceeds the aforesaid upper limit, it may be difficult to give sufficient non-tackiness to paper.

The cross-linking agent (B3) has at least three SiH bonds. The cross-linking agent (B3) may be same as the organopolysiloxane (B2) having at least three SiH bonds as described above. The cross-linking agent (B3) is used in such an amount that a molar amount of SiH moiety is in the range of from 1 to 5 times as much as a molar amount of the alkenyl groups in the organopolysiloxane (A3). Typically, the organopolysiloxane (B3) is used in an amount of from 0.1 to 30 parts by mass, preferably 0.1 to 20 parts by mass, per 100 parts by mass of the organopolysiloxane (A3). If the amount of the SiH moiety is below the aforesaid lower limit, sufficient cross-linkage may not be formed by addition of the SiH moiety with the alkenyl groups and it may be difficult to give sufficient water repellency or non-tackiness to paper. If the amount is above the aforesaid upper limit, increase in the effect is not so high as expected. This lowers cost performance, but also the composition tends to change with time.

Examples of the catalyst (D3) used for the reaction of the organopolysiloxane (A3) with the cross-linking agent (B3) include platinum black, chloroplatinic acid, a complex of chloroplatinic acid and an olefin, a coordination compound of chloroplatinic acid and an alcohol, rhodium, and a complex of rhodium and an olefin. The catalyst (D3) may be used in an effective amount. Typically, the amount is in the range of from 5 to 1,000 ppm, calculated as platinum or rhodium, based on a total amount of (A3) and (B3).

The aforesaid organopolysiloxanes (A2) and (A3) may be used together with the organopolysiloxane (A1). The organopolysiloxanes (A2) and (A3) may be modified with an organic resin having a polar group or hydrophilic moiety such as cellulose resins, acrylic resins, polyester resins and alkyd resins. The modification strengthens interaction between the organopolysiloxane with the cellulosic resin (C) to improve miscibility with the organopolysiloxane. Further, the organopolysiloxane may be held more tightly in a film formed by cellulosic resin (C) to prevent water and oil repellency and non-tackiness from worsening with time. The amount of the resin used for the modification is adjusted depending on a type and a structure of the resin. Generally, the amount is at most 5% by mass based on mass of the organopolysiloxane (A3) or (A2).

In the composition of the present invention, water (E) is a solvent for cellulosic resin (C) and also a dispersion medium for hydrophobic components such as the organopolysiloxane (A). Water (E) may contain impurities found in tap water. However, a strong acid, a strong alkaline, too much alcohol and salts are undesirable because they make it difficult to disperse hydrophobic components.

The amount of water (E) is not particularly limited, but should be adjusted so that the present composition has a viscosity suitable for application by a coating apparatus actually used and an envisaged amount of the composition is applied. Generally, the amount of water (E) is so adjusted that a solid content of the composition is in the range of from 1 to 20%, or in the range of from 100 to 100,000 parts by mass, preferably from 200 to 90,000 parts by mass, per 100 parts by mass of component (A). If the amount is below the aforesaid lower limit, it may be difficult to disperse the hydrophobic components, i.e., the components other than cellulosic resin (C) and surfactant (F). If it is above the aforesaid upper limit, the state of the dispersion may change with time.

In the present compositions, the aforesaid component (C) functions as a surfactant. In addition the surfactant (F) is added to make the dispersion more stable. Examples of the surfactant include nonionic surfactants such as, alkyl ethers such as polyoxyethylenelauryl ether and polyoxyethylenetridecyl ether; and alkyl esters such as polyoxyethylene oleate and polyoxyethylene laurate. These nonionic surfactants may be used alone or as a mixture of two or more of them. Preferably, the surfactant or a mixture thereof has an HLB of from 10 to 15.

Use may also be made of anionic surfactants or cationic surfactants, more specifically alkyl, sulfates such as sodium lauryl sulfate, alkylbenzene sulfates such as dodecylbenzene sulfate, and alkylammonium salts such as sodium cetyltrimethylammonium chloride. These surfactants may preferably be used together with the aforesaid nonionic surfactant for better dispersibility of the hydrophobic components.

Preferably, the amount of the surfactant (F) is a minimum amount to attain and maintain good dispersion for a sufficient period of time. Typically, the amount of the surfactant (F) ranges from 0.1 to 100 parts by mass, preferably from 0.2 to 10 parts by mass, per 100 parts by mass of the organopolysiloxane (A). If the amount is less than the aforesaid lower limit, emulsification may not be enhanced. If the amount is above the aforesaid upper limit, the reaction between the organopolysiloxane (A3) and the cross-linking agent (B3) may be inhibited.

In addition to the above components, the present compositions may comprise the silane having a hydrolyzable group and/or a condensate of partial hydrolysate thereof (G). The silane having a hydrolyzable group has at least one, preferably at least two, more preferably at least three hydrolyzable groups per molecule. The more the hydrolyzable groups, the greater the oil repellency of paper treated with the present composition.

Examples of the hydrolyzable group include alkoxy groups such as methoxy, ethoxy, propoxy, a butoxy, a methoxyethoxy, and isopropenoxy groups; acyloxy groups such as an acetoxy group; alkylamino groups such as an ethylamino group; amido groups; and oxime groups such as ethylmethylbutanoxime group. Alkoxy groups are preferred.

The component (G) may have other groups than the hydrolyzable groups, preferably a monovalent hydrocarbon group having 1 to 20 carbon atoms. Examples of the monovalent hydrocarbon group include alkyl groups such as a methyl group, an ethyl group, a propyl group, and a butyl group; alicyclic groups such as a cyclohexyl group; aryl groups such as a phenyl group and a tolyl group; and alkenyl groups such as a vinyl group and a propenyl group. These groups may be substituted with other groups, such as a halomethyl group where a part or all of the hydrogen atoms are replaced with a halogen atom, a cyanoethyl group having a cyano substituent, a glycidoxypropyl group having an epoxy substituent, an aminopropyl group having an amino substituent, (meth)acryloxypropyl group having an (meth)acryl substituent, and mercaptopropyl group having a thiol substituent.

Examples of the component (G) include tetramethyl silicate, tetraethyl silicate, tetrapropyl silicate, methyltrimethoxysilane, methyltriethoxysilane, methyltripropoxysilane, dimethyldimethoxysilane, dimethyldiethoxysilane, vinyltrimethoxysilane, gamma-glycidoxypropyltrimethoxysilane, N-beta(aminoethyl)-gamma aminopropyltrimethoxysilane, gamma-mercaptopropyltrimethoxysilane, and gamma-methacryloxypropyltrimethoxysilane. Among these, most preferred are tetramethyl silicate and tetraethyl silicate, since these may be more effective in impoving oil repellency.

The component (G) may be an oligosiloxane formed by condensation of partial hydrolysates of a silane having a hydrolyzable group. An advantage of using the condensate of partial hydrolysates is that a smaller amount of hydrolyzed by-products is formed in a preparation step of the composition and, accordingly, adverse effects caused thereby are less. Therefore, if a degree of polymerization of the oligosiloxane is too high, the oligosiloxane is difficult to disperse in the composition and the effect of providing paper with oil repellency tends to decrease. The optimal average degree of polymerization is typically 50 or less, preferably 10 or less, depending on a structure of silane. The oligosiloxane which is a condensate of partial hydrolysates may be used together with a silane monomer.

The component (G) is incorporated in an amount of from 1 to 250 parts by mass, preferably from 2 to 200 parts by mass, per 100 parts by mass of the organopolysiloxane (A). If the amount is below the aforesaid lower limit, the water repellency may not be sufficiently improved. If the amount is above the aforesaid upper limit, dispersibility of the component (G) may decrease with time.

The present composition can be prepared by adding predetermined amounts of the components, except the catalyst (D), to water (E) and dispersing them homogeneously by any known method. An effective amount of the catalyst (D) may be homogeneously dispersed immediately before applying the composition to paper. Before added, the catalyst (D) may be preferably made easily dispersible, for example, by pre-mixing the catalyst with the surfactant (F) or emulsifying the catalyst as will described below.

The organopolysiloxane (A) and the cross-linking agent (B) may be emulsified into an aqueous silicone emulsion and, then, mixed with the other components. The emulsion can be prepared by any known method. For example, organopolysiloxane (A), a part of water (E), cross-linking agent (B), and optionally surfactant (F) are combined and mixed with a stirring device of high shear such as a planetary mixer and a combination mixer and, then, emulsified by phase inversion, followed by addtion of the rest of the water (E) to dilute the emulsion.

The amount of water (E) used for the emulsification is preferably in the range of from 100 to 400 parts by mass per 100 parts by mass of the component (A). Less than 100 parts by mass of water may not be able to disperse the component (A), while more than 400 parts by mass of water may result in deterioration of a dispersion state with time.

The silicone emulsion thus obtained is mixed in an amount of from 20 to 300 parts by mass with 100 parts by mass of the cellulosic resin(C), preferably so that a silicone content in the emulsion is from 5 to 100 parts by mass. Then, water (E) is added to the mixture to adjust the viscosity and concentration which suit to a method of application as described below and a desired application amount. The final mixture is stirred by a known method to prepare a homogeneously dispersed composition.

For silane (G) having a hydrolyzable group and/or a condensate of the partially hydrolyzed products thereof, a manner of blending is preferably selected properly, because dispersibility of component (G) depends on the structure of the hydrolyzable group. For example, one way is to pre-mix component (G) with a surfactant to prepare a self-emulsifying mixture. Another way is to mix component (G), a surfactant and water to prepare a solution or an emulsion of component (G). Any known emulsifying agent and method may be used. For example, one may use the surfactant (F) and the method which are mentioned above for emulsifying the components (A) and (B). Alternatively, the component (G) may be emulsified together with the components (A) and (B). Besides, component (G) may be pre-mixed with water to hydrolyze a part or all of the hydrolyzable groups into silanol groups so as to improve the dispersibility, and an aqueous homogeneous solution thus formed may be added to form the composition. To facilitate the homogenization, the hydrolysis may be promoted by raising a temperature or by adjusting a pH of the aqueous phase to the range of from 2 to 4 with a slight amount of acid. However an excessively low pH may promote the condensation of the hydrolyzed products too much to cause a reverse effect.

In addition to the above components, the present compositions may contain other known components. The amount varies depending on the kind of each component and may be added such that those components do not impair the objects of the present invention, for instance, 5 mass % or less based on the composition. Examples of the other known components include catalyst activity suppressors to suppress the activity of the platinum group metal catalyst such as organic nitrogen compounds, organic phosphorus compounds, acetylene derivatives, oxime compounds and organic halides; components to control tackiness such as silicone resins, silica and organopolysiloxanes without an SiH group or an alkenyl group; leveling agents; thickening agents such as water soluble polymers, for example, polyvinyl alcohol and starch derivatives; and components to improve a film-forming property of the composition such as styrene-maleic anhydride copolymer. These can be added as required.

The present composition may be applied on a paper substrate by any commonly used method for application, depending on viscosity of a coating solution and a coating speed. Examples of the coating methods include application by a coater such as a calendar coater, a gravure coater, an air-knife coater, a roll coater, and a wire bar, and spray coating. An amount of the composition to be applied may be, as a solid content, 0.1 g/m² or more, preferably from 0.5 to 5 g/m². If the amount is below the aforesaid lower limit, it may be difficult to keep good oil repellency of paper. If the amount is above the aforesaid upper limit, only a little additional improvement may be attained, which is economically disadvantageous.

After the application, treated paper is passed through a dryer to be heated to dryness, so that water and oil-repellent paper is obtained. The drying by heating may generally be performed at a temperature of 140 degrees C. or higher for at least 10 seconds.

EXAMPLES

The present invention will be elucidated with the Examples and the Referentials, but not limited thereto.

A. Preliminary Preparation

Preparation Example 1

100 parts by mass of Metholose SM-25, trademark, (hereinafter referred to as c1) from Shin-Etsu Chemical. Co., Ltd., methoxy-substituted cellulose ether with a substitution degree of 2, whose aqueous 2% solution has a viscosity of 20 mPa·s at 20 degrees C., was mixed with 900 parts by mass of water and the mixture was stirred until a uniform 10% solution in water was obtained.

Preparation Example 2

100 parts by mass of Metholose SM-3, trademark (hereinafter referred to as c2) from Shin-Etsu Chemical. Co., Ltd., methoxy-substituted cellulose ether with a substitution degree of 2, whose aqueous 2% solution has a viscosity of 3 mPa·s at 20 degrees C., was mixed with 900 parts by mass of water and the mixture was stirred until a uniform 10% solution in water was obtained.

Preparation Example 3

100 parts by mass of Metholose SM-100, trademark, (hereinafter referred to as c3) from Shin-Etsu Chemical. Co., Ltd., methoxy-substituted cellulose ether with a substitution degree of 2, whose aqueous 2% solution has a viscosity of 80 mPa·s at 20 degrees C., was mixed with 900 parts by mass of water and the mixture was stirred until a uniform 10% solution in water was obtained.

Preparation Example 4

To a 5-liter complex emulsifier having an anchor-shaped paddle to stir a whole space in a vessel, and a rotatable disc having small tooth-shaped protrusions arranged alternately on a uppersurface and an undersurface at the periphery of the disc, were added 100 parts by mass of the polyorganosiloxane (a2) represented by the following formula, which had a viscosity of 2 Pa.s at 25 degrees C. and a silanol content of 0.1 mole/100 g,

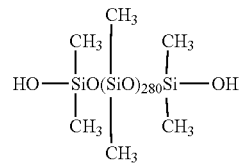

3 parts by mass of the methylhydrogenepolysiloxane (b2) represented by the following formula, which had a viscosity of 25 mPa·s and an H content of 1.5 moles/100 g,

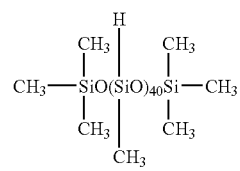

and 1 part by mass of polyoxyethylenelauryl ether with an HLB of 13.6 as a surfactant, and stirred until a uniform mixture was obtained. To the resulting mixture, 60 parts by mass of water was added to emulsify, followed by stirring for 30 minutes. Additionally, 836 parts by mass of water were added to dilute the mixture and stirred to obtain an O/W emulsion with a solid content of 10%.

Preparation Example 5

To the same complex emulsifier as used in Preparation Example 4, were added 100 parts by mass of the polyorganosiloxane (a3) represented by the following formula, which had a viscosity of 0.4 Pa.s at 25 degrees C. and a vinyl content of 0.03 mole/100 g,

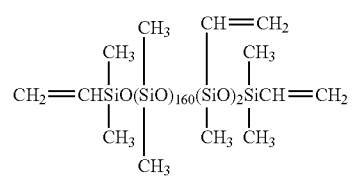

6 parts by mass of the methylhydrogenpolysiloxane (b3) represented by the following formula, which had a viscosity of 25 mPa·s and an H content of 1.5 mole/100 g,

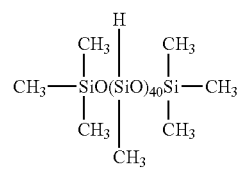

1 part by mass of polyoxyethylenelauryl ether with an HLB of 13.6 as a surfactant, and 0.4 part by mass of ethynylcyclohexanol as a catalyst activity suppressant and stirred. To the mixture, 60 parts by mass of water was added to emulsify, followed by stirring for 30 minutes. Additionally, 833 parts by mass of water was added to dilute the mixture and stirred to obtain an O/W emulsion with a solid content of 10%.

Preparation Example 6

To the same complex emulsifier as used in Preparation Example 4, were added 100 parts by mass of the polyorganosiloxane represented by the following formula (a1), which had a viscosity of 2 Pa.s at 25 degrees C.

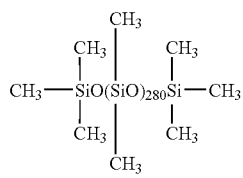

and 1 part by mass of polyoxyethylenelauryl ether with an HLB of 13.6 as a surfactant and stirred. To the mixture, 60 parts by mass of water was added to emulsify, followed by stirring for 30 minutes. Additionally, 839 parts by mass of water was added to dilute the mixture and stirred to obtain an O/W emulsion with a solid content of 10%.

Preparation Example 7

100 parts by mass of polyvinyl alcohol, whose aqueous 4% solution has a viscosity of 60 mPa·s at 20 degrees C. and a degree of saponification of 98%, was mixed with 900 parts by mass of water and the mixture was stirred until a uniform 10% solution in water was obtained.

B. Preparation of a Paper Treating agent

Example 1

In a mixer, 100 parts by mass of the silicone emulsion of Preparation Example 4, 200 parts by mass of the aqueous solution of the cellulose ether of Preparation Example 1, and 0.1 part by mass of sodium carbonate, corresponding to 0.5% based on the silicone component, were mixed well to prepare a composition.

Example 2

100 parts by mass of the silicone emulsion of Preparation Example 5, 1000 parts by mass of the aqueous solution of the cellulose ether of Preparation Example 1, and 1 part by mass of CAT-PM-10A, platinum catalyst emulsion from Shin-Etsu Chemical Co. Ltd., which amount corresponds to 100 ppm as platinum based on the silicone component, were well mixed to prepare a composition.

Example 3

100 parts by mass of the silicone emulsion of Preparation Example 5, 200 parts by mass of the aqueous solution of the cellulose ether of Preparation Example 1, and 1 part by mass of CAT-PM-10A, which amount corresponds to 100 ppm as platinum based on the silicone component, were well mixed to prepare a composition.

Example 4

100 parts by mass of the silicone emulsion of Preparation Example 5, 50 parts by mass of the aqueous solution of the cellulose ether of Preparation Example 1, and 1 part by mass of CAT-PM-10A, which amount corresponds to 100 ppm as platinum based on the silicone component, were well mixed to prepare a composition.

Example 5

100 parts by mass of the silicone emulsion of Preparation Example 5, 200 parts by mass of the aqueous solution of the cellulose ether of Preparation Example 2, and 1 part by mass of CAT-PM-10A, which amount corresponds to 100 ppm as platinum based on the silicone component, were well mixed to prepare a composition.

Example 6

100 parts by mass of the silicone emulsion of Preparation Example 5, 200 parts by mass of the aqueous solution of the cellulose ether of Preparation Example 3, and 1 part by mass of CAT-PM-10A, which amount corresponds to 100 ppm as platinum based on the silicone component, were well mixed to prepare a composition.

Example 7

100 parts by mass of the silicone emulsion of Preparation Example 6 and 200 parts by mass of the aqueous solution of the cellulose ether of Preparation Example 1 were well mixed to prepare a composition.

Example 8

100 parts by mass of the silicone emulsion of Preparation Example 4, 200 parts by mass of the aqueous solution of the cellulose ether of Preparation Example 1, and 3 parts by mass of tetraethoxysilane as (G) were well mixed to prepare a composition.

Example 9

100 parts by mass of the silicone emulsion of Preparation Example 5, 200 parts by mass of the aqueous solution of the cellulose ether of Preparation Example 1, 3 parts by mass of methyltriethoxysilane, and 1 part by mass of CAT-PM-10A, a platinum catalyst emulsion from Shin-Etsu Chemical Co. Ltd., which amount corresponds to a platinum content of 100 ppm based on the silicone component, were well mixed to prepare a composition.

Example 10

100 parts by mass of the silicone emulsion of Preparation Example 5, 200 parts by mass of the aqueous solution of the cellulose ether of Preparation Example 1, 3 parts by mass of a dimer, on average, of tetraethoxysilane as (G), and 1 part by mass of CAT-PM-10A were well mixed to prepare a composition.

Example 11

100 parts by mass of the silicone emulsion of Preparation Example 5, 1000 parts by mass of the aqueous solution of the cellulose ether of Preparation Example 1, 25 parts by mass of tetraethoxysilane, and 1 part by mass of CAT-PM-10A were well mixed to prepare a composition.

Example 12

100 parts by mass of the silicone emulsion of Preparation Example 5, 50 parts by mass of the aqueous solution of the cellulose ether of Preparation Example 1, 0.1 part by mass of tetraethoxysilane, and 1 part by mass of CAT-PM-10A were well mixed to prepare a composition.

Referential Example 1

100 parts by mass of the silicone emulsion of Preparation Example 5, 1200 parts by mass of the aqueous solution of the cellulose ether of Preparation Example 1, and 1 part by mass of CAT-PM-10A, which amount corresponds to a platinum content of 100 ppm based on the silicone content, were well mixed to prepare a composition.

Referential Example 2

100 parts by mass of the silicone emulsion of Preparation Example 5, 30 parts by mass of the aqueous solution of the cellulose ether of Preparation Example 1, and 1 part by mass of CAT-PM-10A, which amount corresponds to a platinum content of 100 ppm based on the silicone content, were well mixed to prepare a composition.

Referential Example 3

100 parts by mass of the silicone emulsion of Preparation Example 5, 200 parts by mass of the aqueous solution of the cellulose ether of Preparation Example 1, 30 parts by mass of tetraethoxysilane, and 1 part by mass of CAT-PM-10A were well mixed to prepare a composition.

Comparative Example 1

100 parts by mass of the silicone emulsion of Preparation Example 5, 200 parts by mass of the aqueous 10% solution of the polyvinyl alcohol of Preparation Example 7, and 1 part by mass of CAT-PM-10A were well mixed to prepare a composition.

C. Preparation of Water- and Oil-Repellent Paper

Each Composition prepared in the Preparation Examples was applied with a bar coater on a sheet of commercially available craft paper of weight of 50 g/m$^2$, in such an amount that a solid content of the applied amount was 2 g/m$^2$. Then the paper was heated in a dryer at 140 degrees C. for 30 seconds to prepare water- and oil-repellent paper.

D. Evaluation Method

Stability of Dispersion

The paper prepared above was left at room temperature for 1 week. By visual inspection, stability of dispersion was rated in three grades from, A, B, and C according to the following criteria:
"A": not separated
"B": slightly separated
"C": separated.

Oil Repellency

Oil repellency was determined according to TAPPI-RC-338, a 3M kit test. According to the 3M kit test, test oils consisting of castor oil, toluene, and heptane in various ratios were put on paper to see whether each oil penetrates into the paper or not. Oil repellency of paper was represented by a maximum kit number of the test oils which do not penetrate into the paper. The larger the maximum kit number, the better the oil repellency. The oil repellency was rated according to the following criteria on the maximum kit number.
"A": 13 or larger.
"B": 12
"C": 8 to 11
"ID": 7 or smaller Water Repellency The water repellency was evaluated by measuring a contact angle between paper and water. The larger the contact angle, the better the water repellency. The water repellency was rated according to the following criteria for the contact angle.
"A": 100 degrees or larger
"B": 90 degrees or larger and smaller than 100 degrees
"IC": smaller than 90 degrees Non-tackiness Tape 31B of 50 mm width from Nitto Denko company was adhered to the paper surface, and aged at 70 degrees C. for 20 hours under a load of 20 g/cm$^2$. Then a force required to peel off the tape from the paper in a direction of 180 degrees was measured with an autograph. The non-tackiness of the paper was rated according to the following criteria on the force.
"A": 1 N or smaller
"B": Larger than 1N Extraction Test A piece of paper of 10 cm$^2$ was treated with the present composition and soaked in 20 ml of distilled water at 60 degrees C. for 30 minutes. Then the water was filtered to prepare a test extract. In an Erlenmeyer flask, 10 ml of the test extract, 0.5 ml of sulfuric acid, and 1 ml of a 0.002 mole/liter potassium permanganate solution were placed and boiled for 5 minutes, to which 1 ml of a 0.01 mole/liter sodium oxalate solution was then added and titration was carried out with a 0.002 mole/liter potassium permanganate solution to an end point where pale red color appeared. Blank titration was run using 10 ml of distilled water instead of the test extract. A potassium permanganate consumption was calculated according to the following equation.

Potassium permanganate consumption in ppm=[titer for the test extract in ml−titer for the blank in ml]*31.6. A less potassium permanganate consumption means better water repellency and a higher safety.

E. Evaluation Results

The results are as shown in the following Tables 1 and 2.

TABLE 1

| | Components and evaluation items | Example 1 | Example 2 | Example 3 | Example 4 | Example 5 | Example 6 | Example 7 |
|---|---|---|---|---|---|---|---|---|
| (A) | a1 | | | | | | | 10 |
| | a2 | 10 | | | | | | |
| | a3 | | 10 | 10 | 10 | 10 | 10 | |
| (B) | b2 | 0.3 | | | | | | |
| | b3 | | 0.6 | 0.6 | 0.6 | 0.6 | 0.6 | |
| (C) | c1 | 20 | 100 | 20 | 5 | | | 20 |
| | c2 | | | | | 20 | | |
| | c3 | | | | | | 20 | |
| (D) | Sodium carbonate | 0.1 | | | | | | |
| | CAT-PM-10A | | 1 | 1 | 1 | 1 | 1 | |
| (E) | Water | 269.6 | 989.3 | 296.3 | 134.3 | 296.3 | 296.3 | 269.9 |
| (F) | Surfactant | 0.1 | 0.1 | 0.1 | 0.1 | 0.1 | 0.1 | 0.1 |

TABLE 1-continued

| Components and evaluation items | | Example 1 | Example 2 | Example 3 | Example 4 | Example 5 | Example 6 | Example 7 |
|---|---|---|---|---|---|---|---|---|
| Evaluation Results | Stability of dispersion | B | B | B | B | B | C | B |
| | Oil repellency | B | A | B | C | C | A | B |
| | Water repellency | B | B | B | B | B | B | C |
| | Non-tackiness | B | B | B | B | B | B | B |
| | Extraction test | 4 | 6 | 4 | 2 | 5 | 3 | 5 |

TABLE 2

| | Components and evaluation items | Example 8 | Example 9 | Example 10 | Example 11 | Example 12 | Referential Example 1 | Referential Example 2 | Referential Example 3 | Comparative Example 1 |
|---|---|---|---|---|---|---|---|---|---|---|
| (A) | a1 | | | | | | | | | |
| | a2 | 10 | | | | | | | | |
| | a3 | | 10 | 10 | 10 | 10 | 10 | 10 | 10 | 10 |
| (B) | b2 | 0.3 | | | | | | | | |
| | b3 | | 0.6 | 0.6 | 0.6 | 0.6 | 0.6 | 0.6 | 0.6 | 0.3 |
| (C) | c1 | 20 | 20 | 20 | 100 | 5 | 120 | 3 | 20 | |
| | c2 | | | | | | | | | |
| | c3 | | | | | | | | | |
| | PVA | | | | | | | | | 20 |
| (D) | Sodium carbonate | 0.1 | | | | | | | | |
| | CAT-PM-10A | | 1 | 1 | 1 | 1 | 1 | 1 | 1 | 1 |
| (E) | Water | 269.6 | 269.3 | 269.3 | 989.3 | 134.3 | 1169.3 | 116.3 | 269.3 | 269.3 |
| (F) | Surfactant | 0.1 | 0.1 | 0.1 | 0.1 | 0.1 | 0.1 | 0.1 | 0.1 | 0.1 |
| (G) | Tetraethoxysilane | 3 | | | 25 | 0.1 | | | 30 | |
| | Tetraethoxysilane dimer | | 3 | | | | | | | |
| | Methyltrimethoxysilane | | | 3 | | | | | | |
| Evaluation Results | Stability of dispersion | B | B | B | B | B | B | B | D | C |
| | Oil repellency | A | A | A | A | B | A | D | A | C |
| | Water repellency | B | B | B | B | B | D | B | B | C |
| | Non-tackiness | B | B | B | B | B | D | B | B | B |
| | Extraction test | 2 | 1 | 1 | 1 | 3 | 7 | 2 | 1 | 9 |

INDUSTRIAL APPLICABILITY

As can be seen from Tables 1 and 2, extracts from the paper treated with the paper treating agents of the Examples were distinctly less than that of the paper treated with the treating agent of the Comparative Example which contains polyvinyl alcohol (PVA). This means that the paper treating agent of the present invention is safe and suitable for the application in food.

The invention claimed is:

1. A paper treating agent comprising
100 parts by mass of an organopolysiloxane (A) which is at least one member selected from the group consisting of an organopolysiloxane (A1), an organopolysiloxane (A2), and an organopolysiloxane (A3), wherein said organopolysiloxane (A1) is represented by the following formula (1)

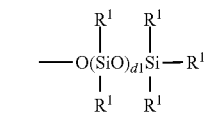

(1)

wherein $R^1$ is methyl, and $X^1$ is a radical represented by the following formula, $$—O(SiO)_{d1}Si—R^1$$

(with $R^1$ groups on the Si atoms)

wherein a1, b1 and d1 are such numbers that the organopolysiloxane (A1) has a viscosity at 25° C. of from 0.05 to 500 Pa·s, and b1 and d1 may be zero, said organopolysiloxane (A2) has at least two hydroxyl groups and is represented by the following formula (2)

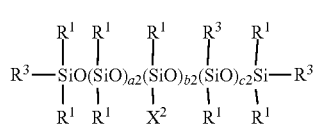

wherein $R^1$ is methyl, $R^3$ is a hydroxyl group, and $X^2$ is a group represented by the following formula:

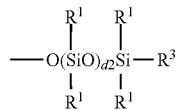

wherein a2, b2, c2 and d2 are such numbers that a viscosity at 25° C. of the organopolysiloxane (A2) ranges from 0.05 to 500 Pa·s, and b2, c2 and d2 may be zero, and said organopolysiloxane (A3) has at least two alkenyl groups and is represented by the following formula (3),

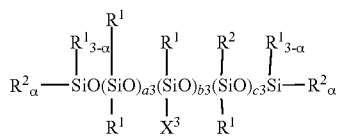

wherein $R^1$ is methyl, $R^2$ represents an alkenyl group, and $X^3$ is a group represented by the following formula:

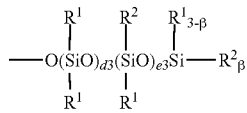

wherein a3, b3, c3, d3, and e3 are such numbers that the organopolysiloxane (A3) has a viscosity at 25° C. of from 0.05 to 500 Pa·s, and b3, c3, d3 and e3 may be zero and alpha and beta are integers of 0 to 3, 0 to 6 parts by mass of a cross-linking agent (B) which is an organopolysiloxane having at least three SiH bonds or hydrolyzable groups represented by the following compositional formula

or the following compositional formula

wherein $R^1$ is methyl, W is a hydrolyzable group which is at least one member selected from the group consisting of alkoxy groups, acyloxy groups, alkylamino groups, amido groups, and oxime groups, and $0 \leq f \leq 3$, $0 < g \leq 3$, and $1 \leq f+g \leq 3$, said cross-linking agent (B) being used in combination with said organopolysiloxane (A2) or said organopolysiloxane (A3), 50 to 1,000 parts by mass of cellulose methyl ether (C), wherein 0.7 to 2.3 hydroxyl groups per glucose unit of said cellulose methyl ether are etherized, and a viscosity of an aqueous 2% solution of said cellulose methyl ether is from 2 to 100 mPa·s at 20° C., 0 to 5 parts by mass, calculated as an active ingredient, of a catalyst (D), 100 to 100,000 parts by mass of water (E), and 0.1 to 100 parts by mass of a surfactant (F), provided that polyvinyl alcohol is excluded.

2. The paper treating agent according to claim 1, characterized in that organopolysiloxane (A) is a mixture of organopolysiloxane (A1) and organopolysiloxane (A2) or is a mixture of organopolysiloxane (A1) and organopolysiloxane (A3).

3. The paper treating agent according to claim 1, characterized in that the agent further comprises from 1 to 250 parts by mass of at least one selected from the group consisting of silanes having a hydrolysable group and condensates of hydrolysates thereof (G), relative 100 parts by mass of (A).

4. The paper treating agent according to claim 3, characterized in that (G) has at least two hydrolyzable groups selected from the group consisting of alkoxy, acyloxy, and oxime groups.

5. Paper treated with the paper treating agent according to claim 1.

* * * * *